(12) United States Patent
Grafe et al.

(10) Patent No.: US 8,683,898 B2
(45) Date of Patent: Apr. 1, 2014

(54) METHOD OF OPERATING A HIGH-SPEED SHEAR

(75) Inventors: Horst Grafe, Hilchenbach (DE); Volker Loth, Freudenberg (DE); Jürgen Merz, Kreuztal (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 10/749,188

(22) Filed: Dec. 30, 2003

(65) Prior Publication Data

US 2004/0177734 A1    Sep. 16, 2004

Related U.S. Application Data

(63) Continuation-in-part of application No. 09/755,869, filed on Jan. 5, 2001, now abandoned.

(30) Foreign Application Priority Data

Jan. 19, 2000   (DE) .................................. 100 01 928

(51) Int. Cl.
   *B23D 25/12*   (2006.01)

(52) U.S. Cl.
   USPC .................................. 83/13; 83/337; 83/344

(58) Field of Classification Search
   USPC .............................................. 83/344, 337, 13
   See application file for complete search history.

(56) References Cited

U.S. PATENT DOCUMENTS

| | | | |
|---|---|---|---|
| 1,802,554 A * | 4/1931 | Hahn | 83/337 |
| 3,570,348 A * | 3/1971 | Hallden | 83/344 |
| 4,058,041 A | 11/1977 | Ito | |
| 4,162,642 A * | 7/1979 | Greven | 83/328 |
| 4,179,958 A * | 12/1979 | Nomura et al. | 83/344 |
| 4,202,229 A * | 5/1980 | Feldkamper | 83/331 |
| 4,470,331 A * | 9/1984 | Eiting et al. | 83/344 |
| 4,656,905 A * | 4/1987 | Ginzburg et al. | 83/337 |
| 4,732,028 A * | 3/1988 | Bodnar | 83/337 |
| 4,911,047 A * | 3/1990 | Hornung et al. | 83/344 |
| 5,088,367 A * | 2/1992 | Cracchiolo et al. | 83/345 |
| 5,207,138 A * | 5/1993 | Sato et al. | 83/337 |
| 6,032,560 A * | 3/2000 | Puchovsky | 83/344 |
| 6,776,075 B1 * | 8/2004 | Grafe et al. | 83/344 |
| 7,107,891 B2 * | 9/2006 | Kneppe et al. | 83/347 |

(Continued)

FOREIGN PATENT DOCUMENTS

| | | | |
|---|---|---|---|
| CA | 2330986 C | * | 7/2008 |
| DE | 26 54 866 | | 6/1977 |

(Continued)

*Primary Examiner* — Jason Daniel Prone
(74) *Attorney, Agent, or Firm* — Lucas & Mercanti, LLP; Klaus P. Stoffel

(57) ABSTRACT

A high-speed shear for transversely cutting rolled strip with knife carriers which can be driven for rotation and are arranged in pairs opposite each other. The knife carriers are supported on shafts of gear wheels arranged at a fixed axial spacing in pairs opposite each other in a shear cassette. The shear cassette is mounted within an outer frame and the shear cassette is provided with a lifting device for raising or lowering the shear cassette within the outer frame. In a method for operating the shear, the two knife carriers are moved into a horizontal position for allowing the strip end to enter or travel through, and the shear cassette is moved within the outer frame into a raised transfer position.

5 Claims, 4 Drawing Sheets

(56) References Cited

U.S. PATENT DOCUMENTS

| | | | |
|---|---|---|---|
| 7,117,776 B1 * | 10/2006 | Grafe et al. | 83/343 |
| 7,258,049 B2 * | 8/2007 | Grafe et al. | 83/37 |
| 7,827,891 B1 * | 11/2010 | Grafe et al. | 83/343 |
| 2001/0001376 A1 * | 5/2001 | Kneppe et al. | 83/344 |
| 2001/0020407 A1 * | 9/2001 | Grafe et al. | 83/337 |

FOREIGN PATENT DOCUMENTS

| | | | |
|---|---|---|---|
| DE | 19637862 A1 * | 3/1998 | |
| DE | 197 46 528 A1 | 4/1999 | |
| DE | 10001928 A1 * | 7/2001 | |
| EP | 0162020 * | 11/1985 | |
| EP | 0 904 877 A2 | 3/1999 | |
| EP | 911125 A1 * | 4/1999 | |
| EP | 1099501 A1 * | 5/2001 | |
| EP | 1099502 A1 * | 5/2001 | |
| EP | 1118409 A1 * | 7/2001 | |
| ES | 2249330 T3 * | 4/2006 | |
| JP | 3049819 | 3/1991 | |
| JP | 7051924 | 2/1995 | |
| JP | 11221714 A * | 8/1999 | |
| JP | 2001179529 A * | 7/2001 | |
| JP | 2001191216 A * | 7/2001 | |
| JP | 2001239423 A * | 9/2001 | |
| JP | 5232344 B2 * | 7/2013 | |
| MX | PA01000668A A * | 6/2002 | |
| WO | WO 9946076 A1 * | 9/1999 | |
| WO | WO 0005019 A2 * | 2/2000 | |

* cited by examiner

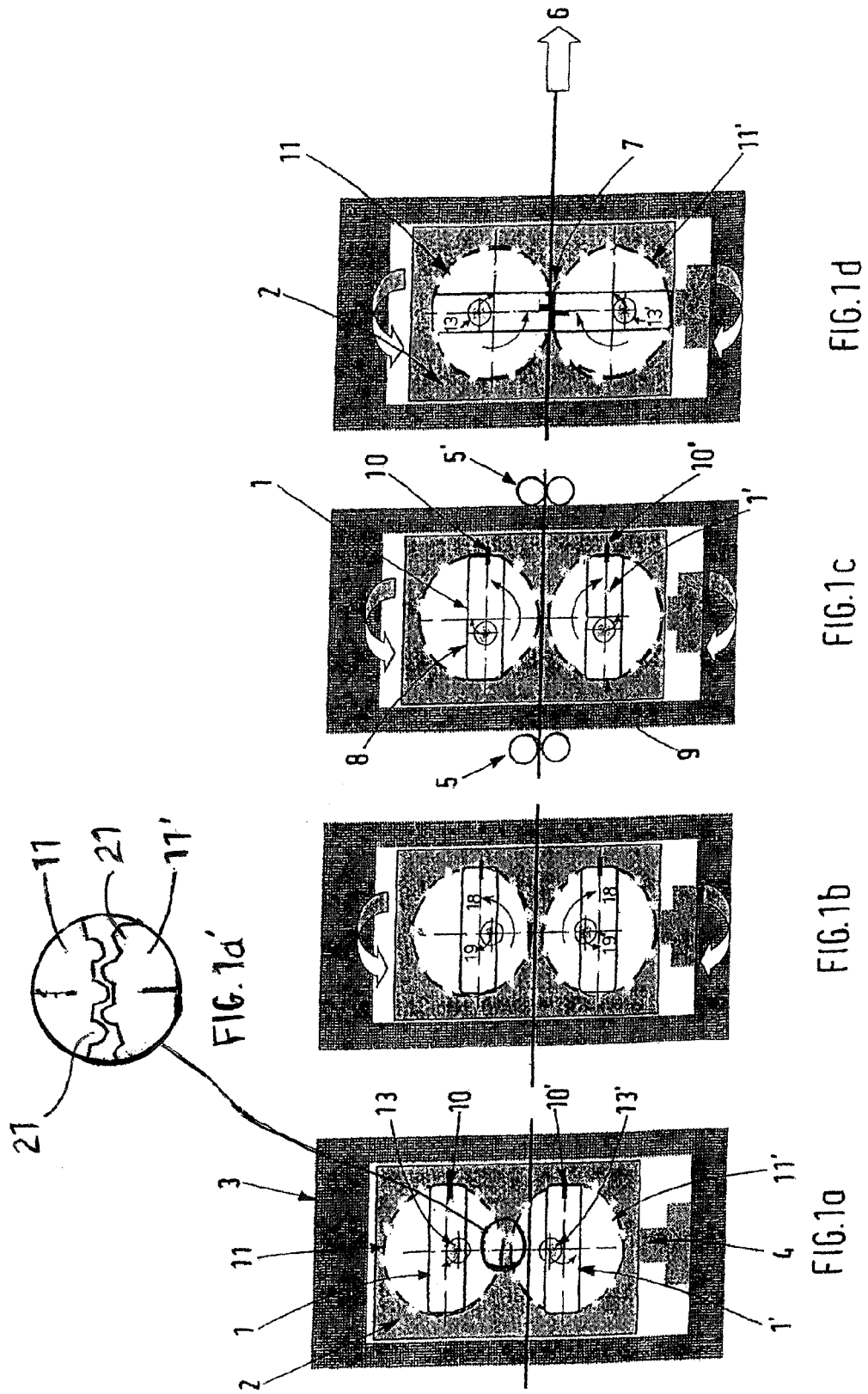

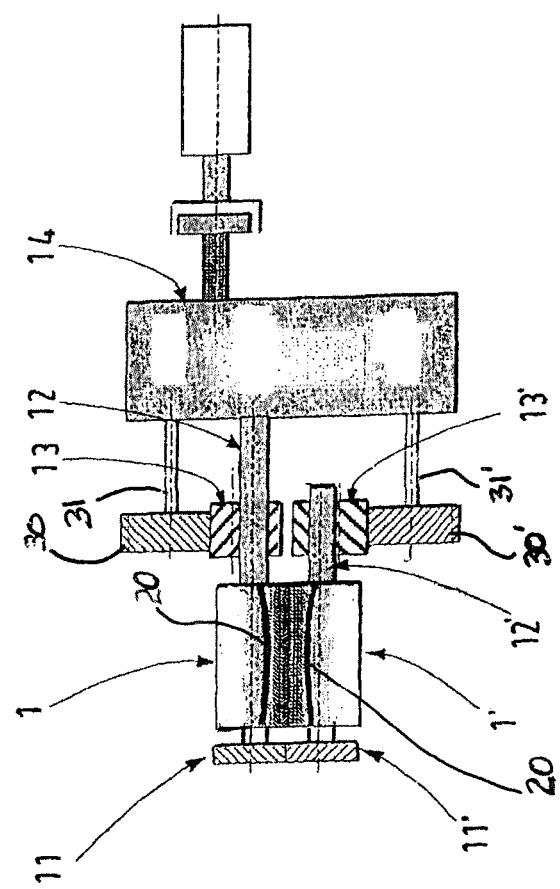

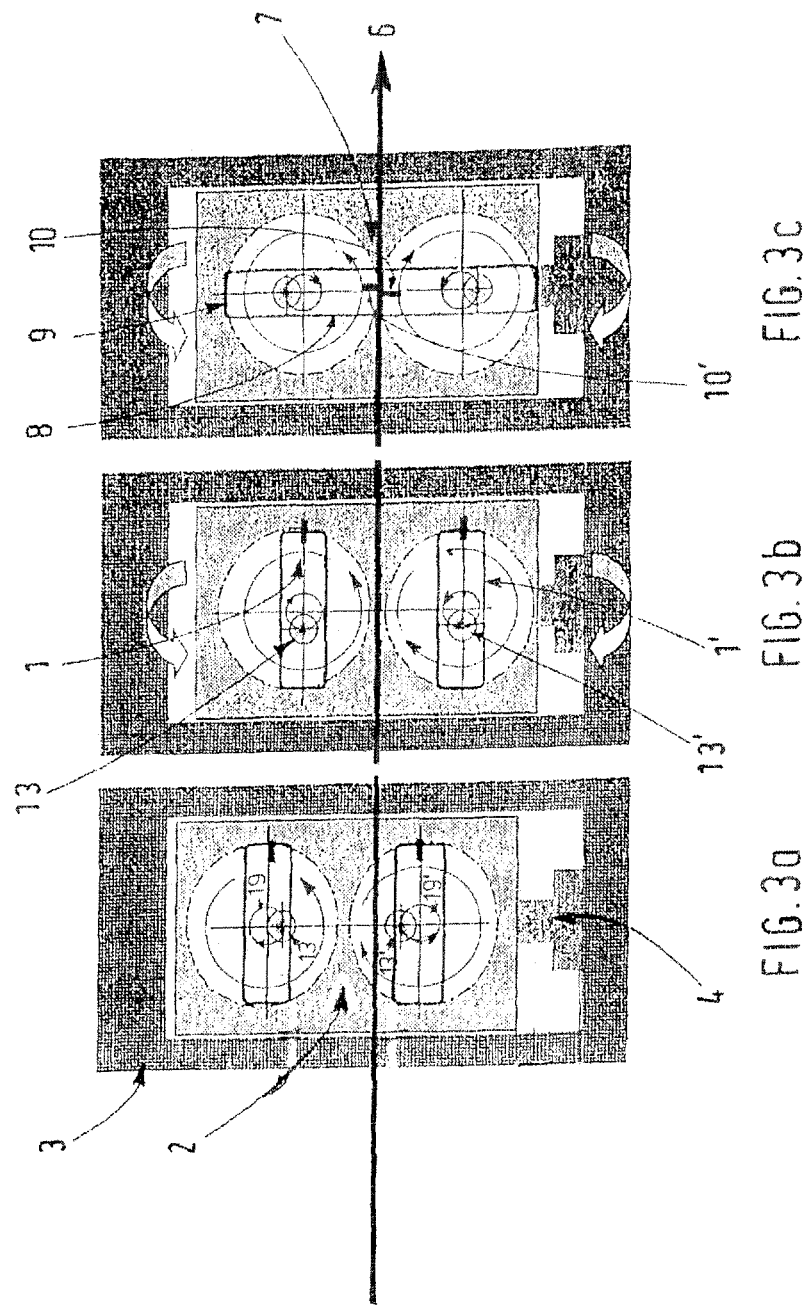

METHOD OF OPERATING A HIGH-SPEED SHEAR

This application is a continuation-in-part of U.S. application Ser. No. 09/755,869, filed Jan. 5, 2001 now abandoned.

BACKGROUND OF THE INVENTION

1. Field of the Invention

The present invention relates to a high-speed shear for transversely cutting rolled strip with knife carriers which are drivable for rotation and are arranged in pairs opposite each other.

2. Description of the Related Art

High-speed shears of the above-described type are generally known in the art.

For example, DE 196 37 862 A1 describes a flying shear with knife edges arranged on oppositely located drums, wherein the knife edges can be accelerated to the feeding speed of the strip to be cut and can be moved towards each other for carrying out a cut. The invention on which this shear is based resides in that the drums arranged on opposite sides can be accelerated by a driving device provided for at least one of the drums to a circumferential speed corresponding to the speed of the strip to be cut, and that at least one of the drums is provided with a separately controllable adjusting device.

DE 197 46 528 A1 describes a high-speed shear which includes two drums, wherein one of the drums is equipped or constructed as a chisel knife and the other is equipped or constructed as an anvil interacting with the other drum. The two drums are moved towards each other for cutting a continuously rolled strip by means of a controlled adjusting device. The synchronization of the two drums is effected by means of electric, electronic or gear-technological means.

EP 0 904 877 A2 discloses a high-speed shear with knife drums which have slightly different diameters and are driven with a slight speed difference through an external branched gear unit. Using an adjusting device through spreading levers, the drums are moved into the cutting position with oppositely located positions of the knives and, after the cut of the rolled strip has been carried out, the drums are moved once again apart from each other.

Finally, DE-OS 26 54 866 describes a flying shear with coupled knife drums. The shear includes a drum turning device with a force transmission coupling both drums for speeds synchronous with the running speed of the supplied material, and a drum adjusting device for adjusting a cutting drum between an open position and a cutting position, and a control device for the motor of the adjusting device, wherein the control device controls the start of the first cutting drum and the adjustment into the cutting position and the return movement of the drum into the initial position. The means for coupling the drums, the drum adjusting device as well as the control device required for the drum adjusting device are of extremely complicated construction which is susceptible to problems. When force transmission takes place, four gear wheels are in engagement with each other, so that a play of the sides of the gear teeth caused by the engagement may lead to an angular deviation of the interacting drum knife and, thus, to damage or to unclean cuts.

SUMMARY OF THE INVENTION

Therefore, starting from the prior art discussed above, it is the primary object of the present invention to further develop a high-speed shear for cutting hot-rolled and/or cold-rolled strip in such a way that exact cuts can be securely carried out at strip speeds of up to about 20 m/sec even if the strip thickness is as little as, for example, 0.8 mm, and that the structural, mechanical and especially gear-technological and control-technological requirements for achieving these cuts are minimized.

In accordance with the present invention, in a high-speed shear of the above-described type, the knife carriers on both sides are mounted in a shear cassette on shafts of gear wheels with a fixed axial distance between them. The shear cassette is mounted within an outer frame and the shear cassette is provided with lifting means for raising or lowering the shear cassette within the outer frame.

In accordance with the solution provided by the present invention, both drums are mounted in a single closed rigid structural component, which means that the distances traveled by the component under force are short and the synchronization gear wheels always remain in engagement. The knife carriers can be moved into a horizontal position and the shear cassette can be moved into a transfer position, so that an opening is provided which allows the beginning of the strip to travel through, even if the beginning of the strip has an upwardly bent front edge. The danger of damage to the shear resulting from upwardly bent strips is reduced.

In accordance with a method for operating the shear, the two knife carriers are moved into the horizontal position and the shear cassette is moved into a raised transfer position within the outer frame when a strip end enters or travels through.

In accordance with a further development of the method, the start-up of the shear is carried out with rotary acceleration of the rate of rotation, wherein the knife carriers are adjusted so as to be at a distance from each other through eccentric bushings and the shear cassette is raised or lowered with its bearing chocks.

It is advantageous that the acceleration time for the start-up of the shear is determined by the step-up ratio between the eccentric bushings and the knife carriers.

In accordance with a further development of the concept of the present invention, the gear geometry of the synchronization gear wheels of the knife carriers is selected in such a way that a displacement in a direction parallel to the axis of the knife carriers of, for example, plus/minus 15 mm is permitted.

In accordance with an advantageous feature, a synchronous rotation of both knife carriers of less than 0.5 mm can be maintained for an exact arch-shaped cut with a small strip thickness of, for example, 0.8 mm.

In accordance with a further development of the present invention, exactly mounted arch-shaped knives are used for the flying shear at a strip speed of 20 m/sec for carrying out an arch-shaped cut with two knives.

Finally, in accordance with another further development of the method of the invention, the tension of the strip for cutting the strip is effected between two pairs of drivers.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1a is a schematic side view of the shear according to the present invention with a raised shear cassette as the beginning of a rolled strip enters or travels through, with both knife carriers being in the horizontal position;

FIG. 1a' is an enlarged view of a portion of FIG. 1a showing tooth engagement;

FIGS. 1b through 1d show individual phases of adjustment of the knife carriers as their rotation is accelerated from zero to the rate of rotation for cutting the strip;

FIG. 2 is a kinematic schematic view of the drive of the knife carriers with their shafts supported in eccentric bushings;

FIGS. 3a through 3c are schematic illustrations of the sequences of movement of the knife carriers and eccentric bushings, starting from the transfer position according to FIG. 3a to the cutting position in FIG. 3c;

DESCRIPTION OF THE PREFERRED EMBODIMENTS

Figure 4A:
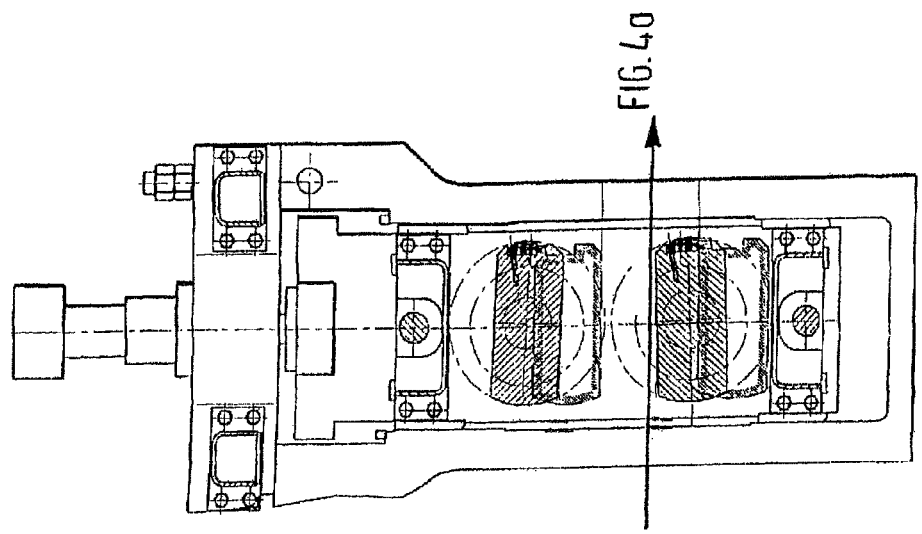
FIG. 4a is a side view of the shear shown in the transfer position.

FIGS. 1 to 4 of the drawing show the high-speed shear according to the present invention for transversely cutting rolled strip with knife carriers 1, 1' which are located opposite each other in pairs and which can be driven for rotation.

The knife carriers 1, 1' are mounted on both sides in a shear cassette 2 on shafts 12,12' of gear wheels 11,11' arranged in pairs opposite each other, driven in synchronous opposite rotation and in permanent engagement with each other. The knife carriers are mounted in eccentric bushings 13,13' in the shear cassette within an outer frame 3. The cassette 2 has lifting means 4 for raising and lowering the shear cassette 2 within the outer frame 3.

Figure 4B:
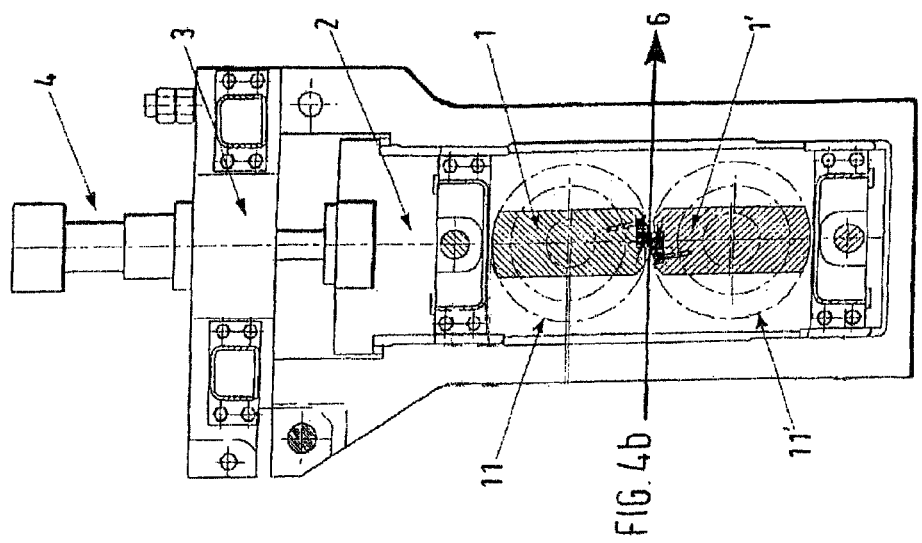
FIG. 4b is a side view of the shear in a cutting position.

The lifting means 4 can be arranged either below the shear cassette 2, as illustrated in FIGS. 1 and 3, wherein the lifting means produce a pressure for overcoming the weight of the shear cassette 2, or the lifting means 4 may be arranged above the outer frame 3, as illustrated in FIGS. 4a, 4b, in which case the lifting means raise the cassette 2 by pulling; in both cases the lifting means 4 act in the same direction.

In accordance with an embodiment of the invention, the shear can be provided with means 5, 5' for guiding the strip 6 relative to the cutting position 7, as illustrated in FIG. 1c. These means 5, 5' may each be a pair of drivers, as is known in the art, wherein the drivers maintain the strip 6 under tension at least in the cutting position 7.

As can be clearly seen, for example, in FIG. 1c, each knife carrier 1, 1' is constructed as a rectangular body with a pair of long sides 8 and a pair of short sides 9. The two short sides 9 are always provided with knife arrangements 10, 10' which can interact in the cutting position 7.

As can be seen in FIG. 1d, the knife carriers 1, 1' are synchronized within the shear cassette 2 for rotation in opposite directions by means of the gear wheels 11, 11' provided for the knife carriers, wherein the gear wheels are always in engagement with each other.

An important embodiment of the invention results from the fact that the shafts 12, 12' are mounted in the eccentric bushings 13, 13', as particularly illustrated in FIG. 2. The shafts 12, 12' and the eccentric bushings 13, 13' are driven through a common gear unit 14 with a fixed transmission ratio between the eccentric bushings 13, 13' and the shafts 12, 12'. The gear unit 14 has gears 30, 30' driven by shafts 31, 31' that engage the eccentric bushings 13, 13' to drive the eccentric bushings. As can be seen in this connection particularly in FIG. 1b, the direction of rotation 18 of the knife carriers 1, 1' is opposite to the direction of rotation 19 of the eccentric bushings. The combined driving of the gear wheels 11, 11' and the eccentric bushings 13, 13' provides the operation shown in FIGS. 1a-1d.

Consequently, in accordance with the fixed transmission ratio, a cutting position 7 is always reached after a number of rotations of the knife carriers 1, 1'. As shown in FIG. 1d, the cutting position 7 is reached when the eccentric bushings 13, 13' are in the upper zenith point and in the lower zenith point, respectively, wherein the knife arrangements 10, 10' are then in engagement with each other for cutting the strip.

As seen in FIGS. 1a and 3a, the knife carriers 1, 1' are each raised with the shear cassette 2 in the transfer position, wherein the eccentric bushing 13 is then on its circular travel path 19 in the lower zenith point thereof, and the eccentric bushing 13' in its circular travel path 19' is in the upper zenith point thereof, and wherein the knife carriers 1, 1' then assume the greatest possible distance between each other.

FIG. 4a is a side view of the shear in the position in which the strip 6 travels through, and FIG. 4b shows the shear in the cutting position.

As can be seen in FIG. 4a and FIGS. 1a and 3a, the two knife carriers 1, 1' are moved to change their horizontal position to allow the beginning of a rolled strip to enter the shear and the raised shear cassette 2 within the outer frame 3 is moved into a transfer position which makes it possible for the beginning of the strip to travel through the shear without problem even if the front end of the strip is bent upwardly.

Subsequently, for starting up the shear, the rate of rotation of the shear is accelerated with the knife carriers 1, 1' being spaced apart from each other, and the shear cassette 2 with its bearing chocks is lowered. The time required for accelerating the start-up of the shear is determined by the transmission ratio between the eccentric bushings 13, 13' and the knife carriers 1, 1'.

It is essential that the gear tooth 21 geometry of the synchronization gear wheels of the knife carriers 1, 1' is selected so that a displacement in a direction parallel to the axis of the knife carriers 1, 1' of, for example, plus/minus 15 mm is possible. It is important for a problem-free operation of the shear that, for an exact arch-shaped cut with a small strip thickness of, for example, 0.8 mm, a synchronous rotation of both knife carriers 1, 1' of less than 0.5 mm is maintained. This prevents damage to the knife arrangement 10, 10'.

In a flying shear for a strip travel speed of up to 20 m/sec it is of essential importance for carrying out a clean arch-shaped cut with two knives that precisely mounted arch-shaped knives 20 are used, as shown, for example, in FIG. 2.

In addition, it is also required for a correct cut that the strip 6 is tensioned between two pairs of drivers 5, 5', as shown in FIG. 1c.

FIG. 2 schematically represents that the gear unit 14 drives the shaft 12 and the eccentric bushings 13, 13'.

The gear wheels 11, 11' rotate the knife carriers 1, 1' and the eccentric bushings 13, 13' axially displace the knife carriers via the shafts 12, 12' as driven by the gear unit 14 via the gears 30, 30' and the shafts 31, 31'.

The invention is not limited by the embodiments described above which are presented as examples only but can be modified in various ways within the scope of protection defined by the appended patent claims.

We claim:

1. A method of operating a high-speed shear for transversely cutting rolled strip with opposing gear wheels arranged in a pair, driven in synchronous opposite rotation and in permanent engagement with each other, the gear wheels having shafts that support knife carriers, the shafts being mounted in eccentric bushings in a shear cassette within an outer frame, the shear cassette includes a lifting device for raising and lowering the shear cassette within the outer frame and means for guiding the strip relative to a cutting position, wherein each of the knife carriers is a flat body with two long sides and two short sides, and wherein one of the short sides of each knife carrier has a knife arrangement, and wherein the knife arrangements are configured to interact in the cutting position, wherein the eccentric bushings are driven by a gear unit with a fixed predefined gear ratio, the method comprising carrying out a start-up of a shearing operation by accelerating a rate of rotation of the gear wheels, changing a distance between the knife carriers via the eccentric bushings, and lowering the shear cassette with the lifting device of the shear cassette, wherein time required for the acceleration of the start-up of the shearing operation is defined by the gear ratio between the eccentric bushings and the knife carriers, wherein the knife carriers are synchronized for opposite rotation within the shear cassette through the gear wheels of the knife carriers which are in constant engagement with each other, the gear wheels of the knife carriers having a tooth geometry such that a relative axial displacement of the knife carriers of plus/minus 15 mm is possible.

2. The method according to claim 1, wherein the knife arrangements have arch-shaped cutting knives, the method comprising maintaining the synchronization of both knife carriers of less than 0.5 mm for obtaining an exact arch-shaped transverse cut of a strip having a thickness of 0.8 mm.

3. The method according to claim 2, comprising mounting the arch-shaped knives to the knife carriers for carrying out the arch-shaped transverse cut with the arch-shaped knives at a travel speed of the strip of up to 20 m/sec.

4. The method according to claim 1, wherein the means for guiding are two pairs of drivers that maintain a tension of the strip between the drivers.

5. The method according to claim 1, comprising rotating each of the eccentric bushings in a direction opposite to a rotation direction of a respective one of the knife carriers.

\* \* \* \* \*